Feb. 9, 1954         C. I. NIELSEN         2,668,646
CAR TOP CARRIER WITH SIDE LOADING DEVICE
Filed Oct. 28, 1950
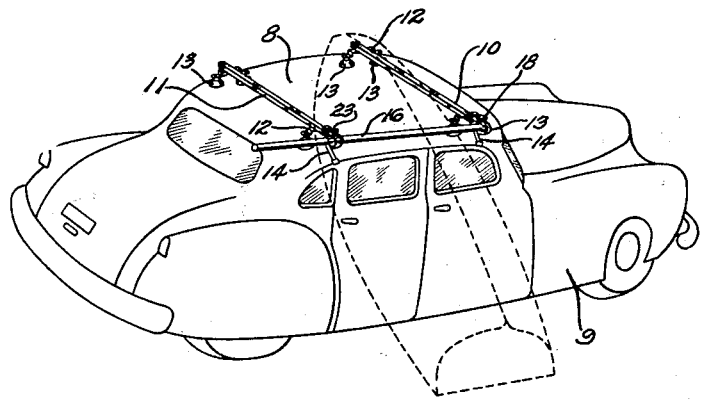
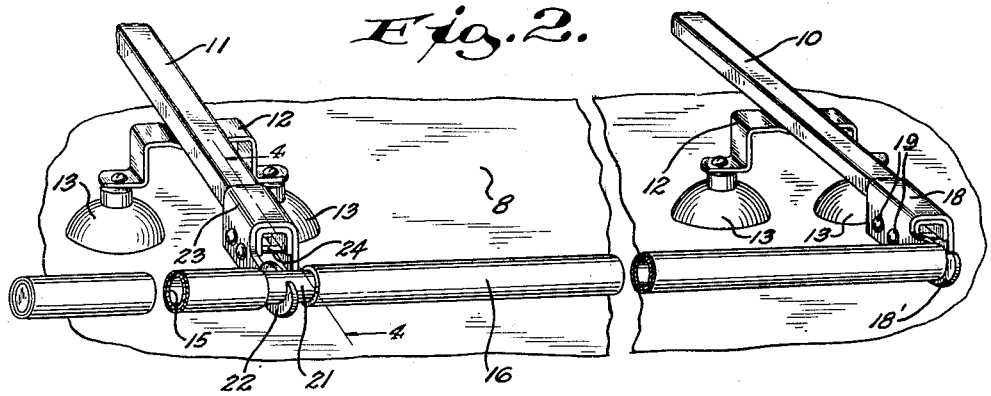
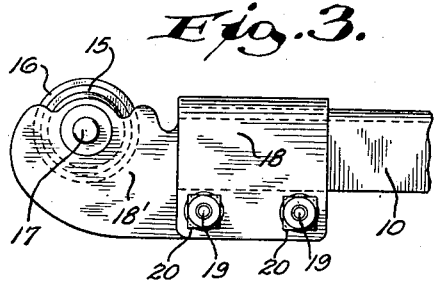
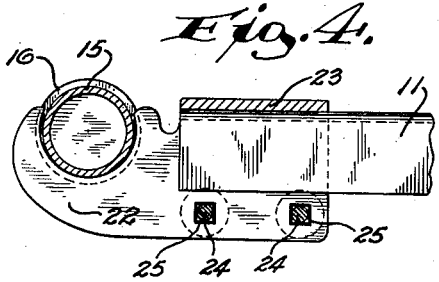
INVENTOR.
Chester I. Nielsen,
BY
Morsell + Morsell
ATTORNEYS.

Patented Feb. 9, 1954

2,668,646

UNITED STATES PATENT OFFICE 2,668,646

CAR TOP CARRIER WITH SIDE LOADING DEVICE

Chester I. Nielsen, West Bend, Wis., assignor to Wesbar Stamping Corporation, West Bend, Wis., a corporation of Wisconsin Application October 28, 1950, Serial No. 192,709

2 Claims. (Cl. 224—42.1)

This invention relates to improvements in car top carriers with side loading devices.

There are available for detachable mounting on the metal tops of automobiles, carriers designed to have mounted thereon for transportation heavy, bulky and unwieldy objects such as boats and the like. In the Pilsner Patent No. 2,469,987 there is disclosed a car top carrier of this type equipped with a rear transverse roller to facilitate the loading and unloading of a bulky object such as a boat onto or off of the carrier from the rear of the automobile. While the aforementioned type of rear loading roller for a car top carrier is entirely satisfactory for automobiles which do not have unduly extended rear walls or compartments, it has been found that with respect to some of the more recent automobile models of the so-called "tour-back" or "jet-back" styles it is extremely difficult and awkward to attempt to load a car top carrier from the rear of the automobile.

With the foregoing in mind it is a primary object of the present invention to provide a car top carrier with a side loading device whereby a bulky object such as a boat or the like may be conveniently loaded or unloaded relative to the car top carrier from the side of the car.

A further object of the invention is to provide a side loading device for a car top carrier, which side loading device is readily attachable to or removable from a conventional car top carrier and may be auxiliary thereto.

A further object of the invention is to provide, in combination with the transverse supporting bars of a car top carrier, a side loading roller adapted to be detachably associated with one pair of ends of the car top carrier bars and which projects substantially beyond the rear transverse bar of the car top carrier to thereby provide a side loading roller of greater length than the width of a heavy bulky object such as a conventional rowboat.

A further object of the invention is to provide a side loading device for car top carriers which is very easy to associate with or disconnect from a car top carrier, which facilitates the loading and unloading of a bulky object, such as a boat, relative to a car top carrier, and which is relatively inexpensive to manufacture and install.

A further object of the invention is to provide a car top carrier with a side loading device which is of very simple construction, which is strong and durable and efficient in operation, which is neat and attractive in appearance, and which is well adapted for the purposes set forth.

With the above and other objects in view, the invention consists of the car top carrier with side loading device, and its parts and combinations as set forth in the claims, and all equivalents thereof.

In the accompanying drawing in which the same reference characters indicate the same parts in all of the views:

Fig. 1 is a perspective view of an automobile having mounted on its metal top a car top carrier equipped with the improved side loading device, there being a broken line showing of a boat being loaded from the side;

Fig. 2 is an enlarged fragmentary perspective view of the car top carrier with the side loading device in relation to the top of an automobile, parts being broken away and shown in section;

Fig. 3 is an enlarged fragmentary side view of the roller carrying bracket by which the front end of the roller is removably attached to the front crossbar of the car top carrier; and Fig. 4 is an enlarged fragmentary detail sectional view taken on line 4—4 of Fig. 2 showing the bracket for attaching a rear portion of the side loading roller to the rear transverse bar of the car top carrier.

Referring to the drawing and more particularly to Fig. 1, it will be seen that the present invention is associated with that type of carrier which is adapted to be detachably mounted on the metal top 8 of an automobile 9. The car top carrier per se is of the type which includes a front transverse bar 10 and a rear transverse bar 11. Customarily the transverse bars 10 and 11 of such carriers are spaced apart a distance of from about 40 to 44 inches. The transverse bars 10 and 11 are preferably of a suitable metal in the form of inverted channels. In the particular embodiment illustrated, said bars 10 and 11 are attached to the top 8 of the car 9 by means of inverted U-shaped brackets 12 carrying suction cups 13. The sides of the transverse bars 10 and 11 rest on and are secured to the brackets 12. To further insure the securement of the transverse bars 10 and 11 in proper position on the car top, straps 14 are provided which have hooks at their outer ends adapted to engage beneath the side gutters of the automobile.

The improved side loading device adapted for association with the elements of the car top carrier described comprises an elongated metal bar 15 of circular form in cross section and formed throughout its length, save for a short gap later to be mentioned, with an outer jacket 16 of rubber, composition, or other material which will prevent scratching or damage to an article being pushed over the side loading device.

The forward end of the bar 15 carries a stud 17 on which is pivotally mounted the extended flange 18' of a front attaching bracket 18. The latter, as will be observed from Fig. 2, is in the form of an inverted U and is adapted to closely enclose an end portion of the front transverse bar 10. Clamping engagement between the bracket 18 and the embraced portion of the transverse bar 10 is effected by bolts 19 carrying nuts 20.

As is evident from the drawing, the side-loading roller in its mounted position is adapted to extend longitudinally of one side of the car top 8 adjacent a pair of ends of the transverse bars 10 and 11 of the car top carrier. That portion of the metal bar 15 which is adjacent the end of the rear transverse bar 11 is devoid of the covering material or an outer jacket whereby a reduced cylindrical extent 21 is provided (see Fig. 2). This reduced cylindrical extent 21 bears in a hook-shaped flange 22 projecting from a rear attaching bracket 23 and is rotatable thereon, the latter being of inverted U-formation to removably fit on the end portion of the rear transverse bar 11 and being detachably secured thereto by bolts 24 carrying nuts 25. The hooked shaped flange 22, as will be observed from Figs. 2 and 4, embraces the under portion of the roller bar 15 and does not interfere with any object which may be riding on the uppermost surface of the side loading roller.

By virtue of the mounting flanges 18' and 22 of the attaching brackets 18 and 23, the covered roller bar 15 is free to turn or roll with a heavy object supported thereon. Also, the arrangement of the rear mounting bracket 23 and its hooked flange 22 is such that the covered roller bar 15 may extend considerably beyond the rear transverse bar 11. This is a very desirable feature in that the side loading roller bar may be of a suitable length to support and engage a bulky object as wide as a conventional rowboat, the latter being of greater width than the distance between the front and rear transverse bars of a conventional car top carrier.

From the foregoing it will be evident that the conventional car top carrier has removably associated therewith the improved side-loading device which includes the elongated roller bar adapted to extend longitudinally of one side of the automobile top, and the attaching brackets. This side-loading device for a car top carrier finds particular utility in connection with a car top carrier mounted on the top of an automobile of the type which has a long sweep to its rear or rear compartment closure. With automobiles of this type it can be appreciated that it would be very difficult and awkward to attempt to load a bulky object, such as a boat, onto the car top carrier from the rear of the car, as was formerly required. With the present invention, in the loading of a boat, for instance, the same has its prow elevated from the side of the car to a point where the sidewalls of the boat will rest on the covered roller bar and then by a simple manipulation one person lifting and pushing on the stern of the boat can roll it transversely of the car top a sufficient distance and when the proper point of balance is reached, the boat or other object is then swung longitudinally of the car top carrier bars 10 and 11 in the conventional manner, in which position it is secured or made fast. The unloading of a boat or other object from the car top carrier is accomplished in a reverse manner.

From the foregoing description it will be apparent that the improved car top carrier with side loading device is particularly suited for use with car top carriers mounted on automobiles which might be difficult to load from the rear, cooperates effectively with a conventional car top carrier, may be readily connected with or removed from the transverse bars of a car top carrier, and is furthermore simple and compact and well adapted for the purposes set forth.

What is claimed as the invention is:

1. A carrier for use in transporting boats or other objects on the tops of automobiles, comprising spaced-apart front and rear transverse bars extending across the automobile top and adapted to have supporting engagement with the article carried, means supporting the bars above and securing them to the automobile top, a loading roller positioned at all times longitudinally of and along one side of the automobile top adjacent a pair of ends of said bars and extending from an end of the front bar substantially beyond the corresponding end of the rear bar to handle a boat or the like which is wider than the distance between said transverse bars, a bracket secured to an end of the front bar, means journalling the front end of said roller on said bracket, a bracket secured to the corresponding end of the rear bar, a portion of said roller adjacent the last-mentioned bracket being of reduced diameter, and means carried by the rear bar bracket forming a semi-bearing engaging only the lower peripheral portion of said reduced portion of the roller whereby the upper peripheral portion of the roller in any turned position remains unobstructed to avoid interference with an object riding on any portion of said roller.

2. A carrier for use in transporting a rowboat on the top of an automobile, comprising front and rear transverse bars extending across the automobile top and adapted to have supporting engagement with the boat carried, the distance between said front and rear transverse bars being less than the distance between the gunwales of the boat at the widest point, means supporting the bars above and securing them to the automobile top, brackets fixedly secured to a corresponding end of each bar, and a roller rotatably supported by said brackets for rotation about its own axis and lying at all times at right angles to said bars, one end portion of said roller extending a substantial distance rearwardly of the rear transverse bar and said roller being of a greater length than the widest transverse dimension of the boat initially engaged by the roller prior to being directed and turned onto the transverse bars, the roller supporting bracket carried by the rear transverse bar rotatably engaging an intermediate portion of the roller on the underside thereof to avoid interference with any portion of an engaged boat riding on the upper surface of the roller.

CHESTER I. NIELSEN.

References Cited in the file of this patent

UNITED STATES PATENTS

| Number | Name | Date |
|---|---|---|
| 2,325,762 | Ford | Aug. 3, 1943 |
| 2,446,092 | Lait | July 27, 1948 |
| 2,464,979 | Hyatt | Mar. 22, 1949 |
| 2,469,945 | Brei | May 10, 1949 |
| 2,469,987 | Pilsner | May 10, 1949 |
| 2,613,020 | Berry | Oct. 7, 1952 |

FOREIGN PATENTS

| Number | Country | Date |
|---|---|---|
| 216,092 | Switzerland | Nov. 17, 1941 |